US009175571B2

(12) United States Patent
Floyd

(10) Patent No.: US 9,175,571 B2
(45) Date of Patent: Nov. 3, 2015

(54) CONNECTING SYSTEM FOR METAL COMPONENTS AND CMC COMPONENTS, A TURBINE BLADE RETAINING SYSTEM AND A ROTATING COMPONENT RETAINING SYSTEM

(75) Inventor: Donald Earl Floyd, Greenville, SC (US)

(73) Assignee: General Electric Company, Schenectady, NY (US)

( * ) Notice: Subject to any disclaimer, the term of this patent is extended or adjusted under 35 U.S.C. 154(b) by 839 days.

(21) Appl. No.: 13/423,658

(22) Filed: Mar. 19, 2012

(65) Prior Publication Data

US 2013/0243601 A1 Sep. 19, 2013

(51) Int. Cl.
*B64C 27/48* (2006.01)
*F01D 5/28* (2006.01)
*F01D 5/30* (2006.01)

(52) U.S. Cl.
CPC .............. *F01D 5/284* (2013.01); *F01D 5/3007* (2013.01); *F01D 5/3053* (2013.01); *F01D 5/3084* (2013.01); *F05D 2260/30* (2013.01); *F05D 2300/50212* (2013.01); *F05D 2300/6033* (2013.01); *F05D 2300/612* (2013.01)

(58) Field of Classification Search
CPC ..... F01D 5/3015; F01D 5/326; F01D 5/3007; F01D 5/323; F01D 5/3053; F01D 5/284; F01D 5/3023; F01D 5/3084
USPC ............................. 416/220 R, 219 R; 248/65
See application file for complete search history.

(56) References Cited

U.S. PATENT DOCUMENTS

| | | | | |
|---|---|---|---|---|
| 4,084,922 A | | 4/1978 | Glenn | |
| 5,240,377 A | | 8/1993 | Farr | |
| 5,380,152 A | | 1/1995 | Sikorski et al. | |
| 5,405,245 A | | 4/1995 | Cornelius | |
| 5,536,145 A | * | 7/1996 | Vandendriessche | 416/213 R |
| 5,593,275 A | | 1/1997 | Venkatasubbu et al. | |
| 5,735,673 A | | 4/1998 | Matheny et al. | |
| 6,086,327 A | | 7/2000 | Mack et al. | |

(Continued)

FOREIGN PATENT DOCUMENTS

| | | | |
|---|---|---|---|
| CN | 1629453 | A | 6/2005 |
| DE | 311096 | A1 | 9/1982 |

(Continued)

OTHER PUBLICATIONS

Search Report from EP Application No. 13158942.6 dated Dec. 5, 2013.

(Continued)

*Primary Examiner* — Edward Look
*Assistant Examiner* — Aaron R Eastman
(74) *Attorney, Agent, or Firm* — McNees, Wallace & Nurick LLC

(57) ABSTRACT

A connecting system for metal component and CMC components, a turbine blade retaining system and rotating component retaining system are provided. The connecting system includes a retaining pin, a metal foam bushing, a first aperture disposed in the metal component, and a second aperture disposed in the ceramic matrix composite component. The first aperture and the second aperture are configured to form a through-hole when the metal component and the ceramic matrix composite component are engaged. The retaining pin and the metal foam bushing are operably arranged within the through-hole to connect the metal component and the ceramic matrix composite component.

19 Claims, 2 Drawing Sheets

(56) References Cited

U.S. PATENT DOCUMENTS

| | | | |
|---|---|---|---|
| 6,431,781 | B1 | 8/2002 | Schenk |
| 6,471,478 | B1 | 10/2002 | Mashey |
| 6,670,021 | B2 | 12/2003 | Schroder et al. |
| 6,840,766 | B2 | 1/2005 | Abdullah et al. |
| 6,878,246 | B2 | 4/2005 | Latvaitis et al. |
| 7,445,427 | B2 | 11/2008 | Gutknecht et al. |
| 7,523,616 | B2 | 4/2009 | Zigan et al. |
| 7,563,071 | B2 | 7/2009 | Campbell et al. |
| 7,704,042 | B2 | 4/2010 | Brueckner et al. |
| 2009/0068008 | A1 | 3/2009 | Oishi |
| 2011/0176907 | A1 | 7/2011 | Groves et al. |

FOREIGN PATENT DOCUMENTS

| | | | |
|---|---|---|---|
| DE | 3110096 | A1 | 9/1982 |
| EP | 1394387 | A2 | 3/2004 |
| JP | 2006204010 | A | 8/2006 |

OTHER PUBLICATIONS

Partial Search Report and Written Opinion from corresponding EP Application No. 13158942, dated Jul. 16, 2013.

* cited by examiner

CONNECTING SYSTEM FOR METAL COMPONENTS AND CMC COMPONENTS, A TURBINE BLADE RETAINING SYSTEM AND A ROTATING COMPONENT RETAINING SYSTEM

FIELD OF THE INVENTION

The present invention relates generally to power generation systems and more specifically to connecting system for metal component and ceramic matrix composite (CMC) components in power generation systems.

BACKGROUND OF THE INVENTION

Ceramic matrix composites (CMC's) offer high material temperature capability. In the gas turbine field, however, CMC components often require attachment to, or engagement with, lower temperature metallic gas turbine components. Problems associated with the attachment of known silicon carbide CMC's to metallic components include wear, oxidation (due to ionic transfer with metal), stress concentration (from clamping loads), transition to thick section fabrication, and fiber damage in creating holes in the CMC's.

Therefore, a connecting system for metal components and CMC components, a turbine blade retaining system and rotating component retaining system that do not suffer from the above drawbacks is desirable in the art.

SUMMARY OF THE INVENTION

According to an exemplary embodiment of the present disclosure, a connecting system for connecting a metal component and a ceramic matrix composite is provided. The connecting system includes a retaining pin, a metal foam bushing, a first aperture disposed in the metal component, and a second aperture disposed in the ceramic matrix composite component. The first aperture and the second aperture are configured to form a through-hole when the metal component and the ceramic matrix composite component are engaged. The retaining pin and metal foam bushing are operably arranged within the through-hole to connect the metal component and the ceramic matrix composite component.

According to another exemplary embodiment of the present disclosure, a turbine blade retaining system is provided. The turbine blade retaining system includes a reinforcing pin, a metal foam bushing, a first aperture disposed in an airfoil segment, and a second aperture disposed in a holder segment. The first aperture and the second aperture form a through-hole for receiving the metal foam bushing and the reinforcing pin when the airfoil segment and holder segment are engaged. The retaining pin and metal foam bushing are operably arranged within the through-hole to connect the airfoil segment and the holder segment to form the turbine blade retaining system.

According to another exemplary embodiment of the present disclosure, a rotating component retaining system is provided. The rotating component retaining system includes a retaining pin, a first aperture disposed in a portion of the rotating component, a second aperture disposed in a holder segment, and a bushing. The rotating component has a first coefficient of thermal expansion. The holder segment has a second coefficient of thermal expansion. The bushing has a third coefficient of thermal expansion, the third coefficient of thermal expansion being intermediate to the first coefficient of thermal expansion and second coefficient of thermal expansion. The first aperture and the second aperture form a through-hole for receiving the bushing and the reinforcing pin when the rotating component and holder segment are engaged. The retaining pin and bushing are operably arranged within the through-hole to connect the rotating component and the holder segment to form the rotating component retaining system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a connecting system for connecting a metal component and a CMC component that do not suffer from the drawbacks in the prior art. There is a need for system to connect metal components and CMC components that provides a more consistent loading in the CMC pin hole and reduces vibration and reduces stress between the components having different coefficients of thermal expansion, such as CMC and metal components.

One advantage of an embodiment of the present disclosure includes a retaining pin that fits tight in the connecting system. Another advantage of an embodiment of the present disclosure includes a retaining pin that has a coefficient of thermal expansion that is similar to the first component or metal component. Yet another advantage of an embodiment of the present disclosure includes a retaining pin that has a coefficient of thermal expansion that is greater than that of the second component or CMC component. Another advantage of an embodiment of the present disclosure includes a CMC component having an aperture that is greater than the retaining pin to allow for coefficient of thermal expansion (CTE) mismatch. Another advantage of an embodiment of the present disclosure is high temperature metal foam bushing that creates contact with the retaining pin, CMC component, and metal holder throughout operation. Yet another advantage of an embodiment of the present disclosure is that the high temperature metal foam bushing reduces stress in CMC airfoil stem. Another advantage of an embodiment of the present disclosure is that the CMC airfoils are more tightly secured in the metal holders thereby reducing vibration in the power generation system. Another advantage of an embodiment of the present disclosure is that it provides a more consistent loading in the CMC airfoil stem pin hole or aperture. Another advantage of an embodiment of the present disclosure is that it allows for retrofit of the existing fleet of power generation systems with CMC airfoils without having to replace or retool the metal holders in the existing power generation system. Another advantage of an embodiment of the present disclosure is reduced low cycle fatigue considerations on the CMC bucket stem. Another advantage of an embodiment of the present disclosure is a system for joining two materials with differing coefficients of thermal expansion.

Power generation systems 10 include, but are not limited to, gas turbines, steam turbines, and other turbine assemblies. An embodiment of the disclosure is shown in FIGS. 1-3, but the present disclosure is not limited to the illustrated structure.

Figure 1:
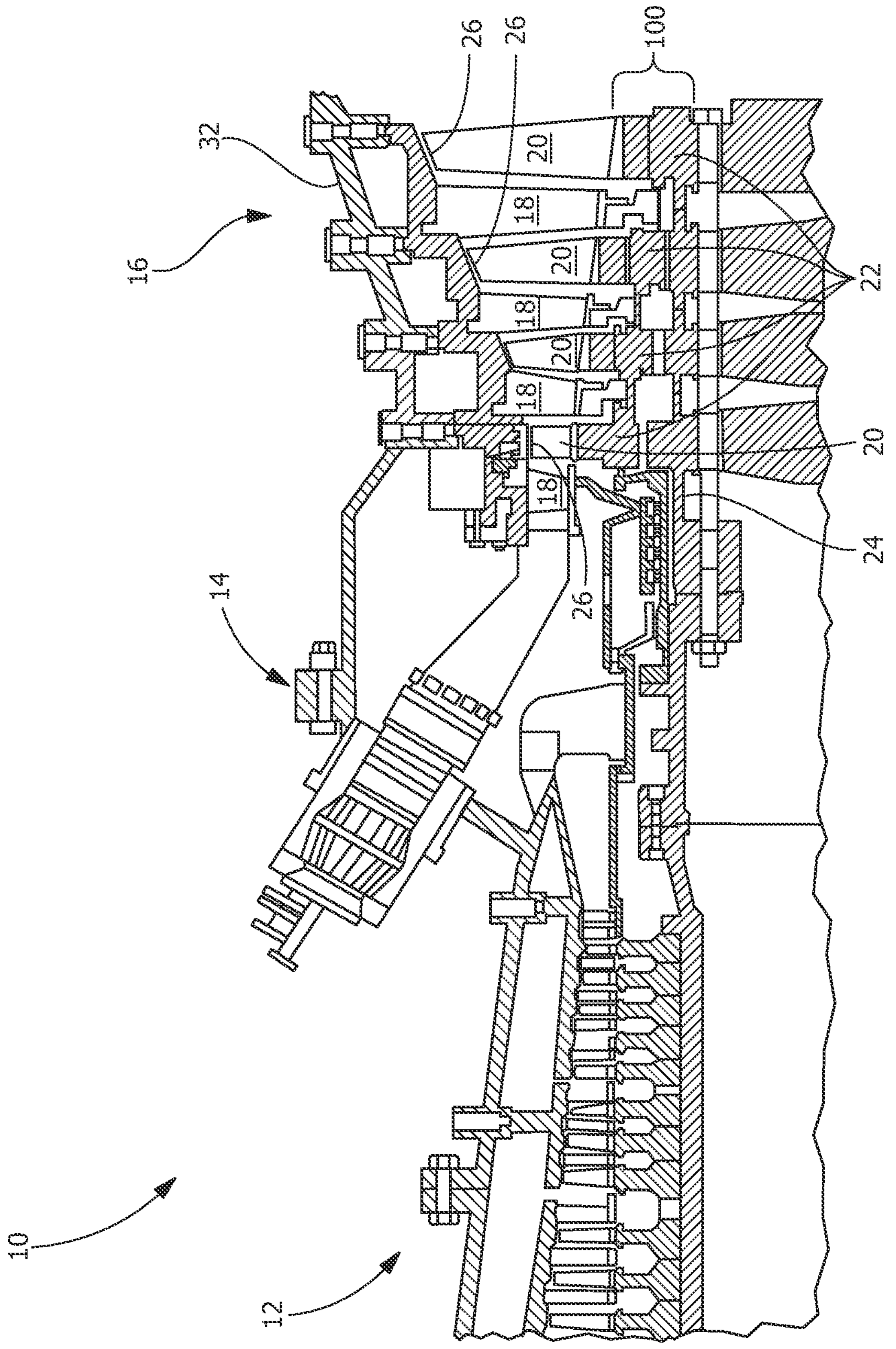
FIG. 1 is a schematic of a power generation system of the present disclosure.

FIG. 1 shows an example of a power generation system 10, in this embodiment a gas turbine engine, having a compressor section 12, a combustor section 14 and a turbine section 16. In the turbine section 16, there are alternating rows of stationary airfoils 18 (commonly referred to as vanes) and rotating airfoils 20 (commonly referred to as blades). Each row of blades 20 is formed by a plurality of airfoils 20 attached to a disc 22 provided on a rotor 24. The blades 20 can extend radially outward from the discs 22 and terminate in a region known as the blade tip 26. Each row of vanes 18 is formed by attaching a plurality of vanes 18 to a vane carrier 28. The vanes 18 can extend radially inward from the inner peripheral surface of the vane carrier 28. The vane carrier 28 is attached to an outer casing 32, which encloses the turbine section 16 of the engine. During operation of the power generation system 10, high temperature, high velocity gases flow through the rows of vanes 18 and blades 20 in the turbine section 16. The connecting system 100 retains the rotating airfoils 20 or blades in the casing 32 of the power generation system 10.

Figure 2:
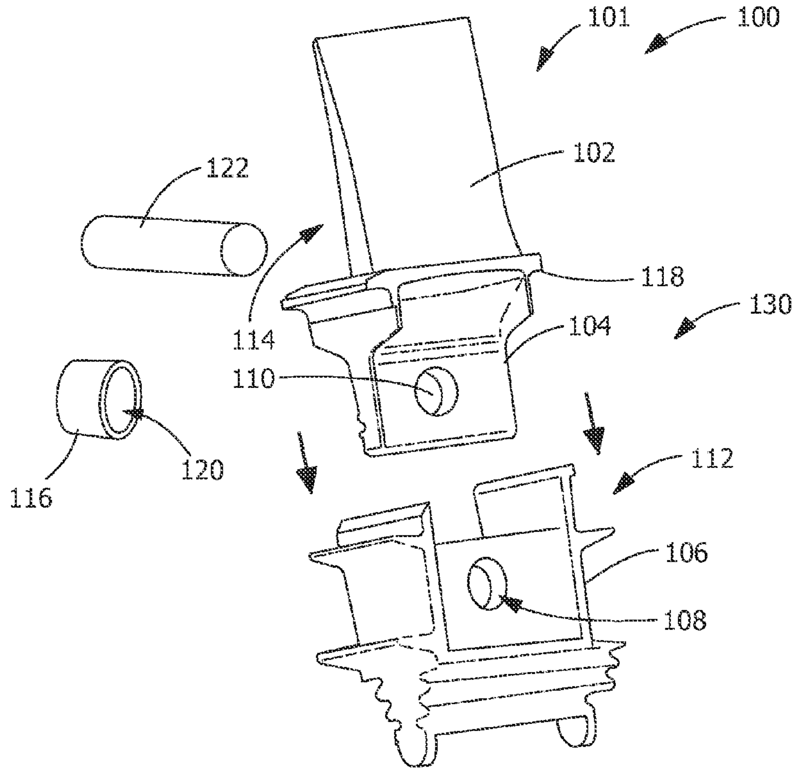
FIG. 2 is an exploded perspective view of the connecting system of the present disclosure.
Figure 3:
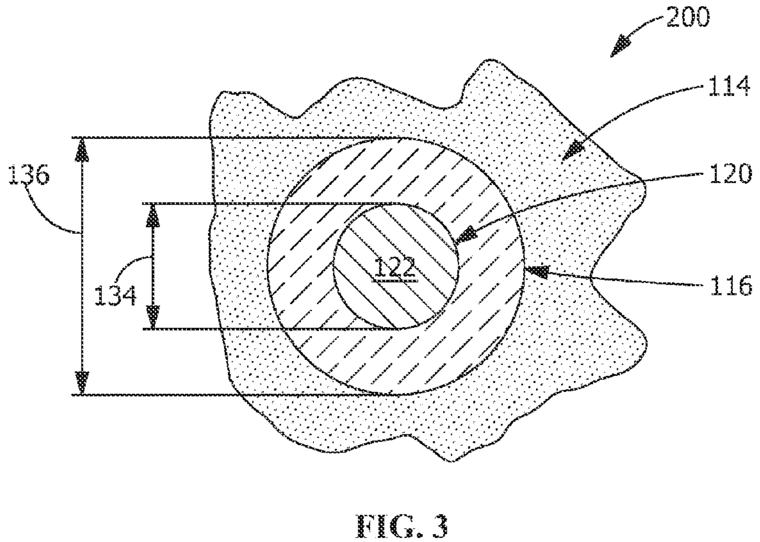
FIG. 3 is a cross-section of the assembled rotating component connecting system of the present disclosure.
Figure 4:
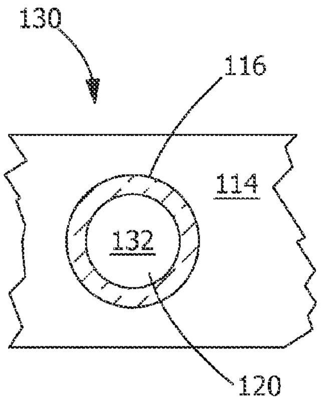
FIG. 4 is a side view of the partially assembled connecting system of the present disclosure.

As shown in FIG. 2 the connecting system 100 includes a retaining pin 122, a metal foam bushing 116, a first aperture 108 disposed in the metal component 112. The connecting system 100 includes a second aperture 110 disposed in the CMC component 114. The first aperture 108 and the second aperture 110 are configured to form a through-hole 132 (see FIG. 4) when the metal component 112 and the CMC component 114 are engaged. The retaining pin 122 and metal foam bushing 116 are operably arranged within the through-hole 132 to connect the metal component 112 and the CMC component 114.

As shown in FIG. 2, the connecting system 100 is a turbine connecting system 101. The turbine connecting system 130 includes a reinforcing pin 112, a metal foam bushing 116, a first aperture 108 disposed in an airfoil segment or stem 104 and a second aperture 110 disposed in a holder segment 106. The metal foam bushing 116 includes an inner diameter 134 and an outer diameter 136 defining a bushing aperture 120 for receiving the reinforcing pin 112. The first aperture 108 of the airfoil stem 104 and the second aperture 110 of the holder segment 106 form a through-hole 132 (see FIG. 4) for receiving the metal foam bushing 116 and the retaining pin 112 (not shown in FIG. 3) when the airfoil stem 104 and the holder segment 106 are engaged. The retaining pin 122 and metal foam bushing 116 are arranged and disposed in the through-hole 122 to connect the airfoil stem 104 and the holder segment 106 to form the turbine blade retaining system 130.

In one embodiment, the airfoil segment or stem 104 is a CMC component. In another embodiment, the airfoil 102 is formed as a monolithic CMC component, having the airfoil, airfoil platform 118, and airfoil stem 104 formed as single CMC component.

It is generally understood that metals generally have higher coefficients of thermal expansion than ceramics or CMC materials. In operation, to retain the rotating part in place the retaining pin 122 will need to have a higher CTE than the CMC airfoil stem 104 that it is situated in. In one embodiment, the material and size of the retaining pin 122 are chosen to provide desired sheer strength to prevent airfoil stem 104 pull load/creep.

In constructing the second aperture 110 or pin hole in the CMC component 114, at cold state, a slightly larger aperture than the outer diameter of the retaining pin 122 is necessary to accommodate the retaining pin 122 when it expands to provide an interference fit with the foam metal bushing 116 without out cracking the CMC component through-hole 132 at normal power generation system 10 operating conditions. In one embodiment, the inner diameter 134 of the metal foam bushing 116 is sized such that the reinforcing pin 122 can grow or expand into the metal foam bushing 116 without yielding the bushing. Generally, the retaining pin 122 will have a CTE that is approximately greater than or equal to the CTE of the CMC component. In one embodiment, the retaining pin 122 is selected from the same material as the metal component.

FIG. 3 is a cross-section of a rotating component retaining system 200. In one embodiment, the rotating component is an airfoil 20 or blade (see FIG. 1). The rotating component retaining system 200 includes a retaining pin 122, a first aperture 108 (see FIG. 2) disposed in a first component 112 (see FIG. 3), a second aperture 110 (see FIG. 2) disposed in a second component 114, and a bushing 116. The first and second apertures 108 and 110 are also referred to as pin holes. The first component 112 has a first coefficient of thermal expansion. The second component 114 has a second coefficient of thermal expansion. The bushing 116 has a third coefficient of thermal expansion, the third coefficient of thermal expansion being intermediate to the first coefficient of thermal expansion and second coefficient of thermal expansion. The first aperture 108 and the second aperture 110 form a through-hole 132 (see FIG. 4) or pin hole for receiving the bushing 116 and the retaining pin 122 when the first component 112 and the second component 114 are engaged. The bushing 116 includes a bushing aperture 120 for receiving the retaining pin 122. The retaining pin 122 and bushing 116 are operably arranged within the through-hole 132 to connect the first component 112 and the second component 114 to form the rotating component retaining system 200. In one embodiment, the first coefficient of thermal expansion of the first component 112 is approximately greater than or equal to the second coefficient of thermal expansion of the second component 114. In another embodiment, the third coefficient of thermal expansion of the bushing 116 is less than or approximately equal to the second coefficient of thermal expansion of the second component 114. In another embodiment, the bushing 116 is an open celled or closed celled metal foam bushing.

In one embodiment of the rotating component retaining system 200, the first component 112 is a metal component, such as, but not limited to, a holder segment 106 (see FIG. 3). In one embodiment, the first component 112 is a metal component and is constructed from material selected from, but not limited to, titanium, nickel, iron, cobalt, chromium, alloys thereof, and combinations thereof. In one embodiment, the second component 114 is a CMC component, such as, but not limited to, an airfoil stem 104 (see FIG. 3). In one embodiment, the CMC component is selected from any variety of CMC materials used in the art, such as, but not limited to, SiC/SiC, SiC/Si—SiC, SiC/C, $SiC/Si_3N_4$ and oxide-based materials such as $Al_2O_3/Al_2O_3$—$SiO_2$, the CMC includes a matrix material selected from SiC, SiN, and combinations thereof. In one embodiment, the metal foam bushing is selected from a material that is approximately that of the first component 112 or holder segment 106. In one embodiment, the metal foam bushing includes materials selected from, but not limited to titanium, nickel, iron, cobalt, chromium, alloys thereof, and combinations thereof. In one embodiment, the metal foam bushing 116 is constructed from metal foam material available under the trademark FECRALLOY™ FeCrAlY, (by Porvair Fuel Cell Technology, 700 Shepherd Street, Hendersonville, N.C.) which is an iron-chromium-aluminum-yttrium alloy with a nominal composition by weight %, respectively, of 72.8% iron, 22% chromium, 5% aluminum, and 0.1% yttrium and 0.1% zirconium.

Metallic foam for the metal foam bushing 116 can be made by any suitable method, such as, but not limited to, chemical vapor deposition, investment casting, and slurry coating. The chemical vapor deposition technique includes producing a metal gas and desublimating the gas onto a polymer substrate, heating the substrate volatilizing the polymer which leaves a metallic replication of the substrate intact, and then again heating to sinter the metallic material to produce the metallic foam. The investment casting technique involves utilizing a polymer substrate as a preform within a mold cavity and filing the mold cavity with a mold material and volatizing the polymer substrate and then pouring molten metal into the mold cavity where heat and pressure are applied. After the casting is complete, the mold material is removed, and an exact replication of the polymer substrate remains as a metallic foam. The slurry coating technique involves producing a paint-like mixture of fine metal powders and polymer binders and coating this paint-like mixture on an open cell polymer foam using processes such as spin impregnation, roller impregnation, and spray impregnation. The impregnated open cell polymer foam is compressed to expel excess slurry, then dried and fired to burn out the polymer foam, and sintered to produce the metallic foam. The rigid metallic foam produced using any of the above described techniques has a plurality of interconnecting voids having substantially the same structural configurations as the polymer foam which was the starting material. The metallic particles used, include, but are not limited to, titanium, nickel, iron, cobalt, chromium, alloys thereof, and combinations thereof.

The metal foam can have a low density, between 5% and 40% of the solid parent metal, and high strength. The term "compliant" or "compliancy" is here meant as having a modulus of elasticity which accommodates interference fit during assembly and differential thermal expansion between the retaining pin 122 and CMC component or airfoil stem 104, without transferring forces which result in damage to the CMC airfoil stem 104. The three dimensional network structure with high surface area to density and a high melting temperature over 1000° C. allows for use the metal foam bushing 116 at operating temperatures of power generation systems. In one embodiment, the metal foam bushing 116 compresses to provide a good fit between the outer surface of the retaining pin 122 and the through-hole 132 outer surface. In addition, the yield stress or compression stress at which the material will irreversibly begin to compress the metal foam can be varied depending upon the density of the foam. For example, metal foam having a density on the order of 3-4% relative density will have a yield strength of about 1 MPa. A material having a relative density of about 4.5-6% will have a yield strength of approximately 2 MPa, while a material having a relative density greater than about 6% will have a yield strength of about 3 MPa or greater.

In one embodiment, the metal foam bushing 116 is selected from a closed cell metal foam. In this embodiment, the relative density of foam is greater than that of the open cell metal foam. Additionally, the stress strain behavior of a closed-cell metal foam bushing is different than that of the open cell metal foam. A suitable example of a closed-cell metal foam bushing 116, is but not limited to, a nickel closed cell metal foam.

In one embodiment, the thickness of the metal foam bushing 116 is such that the metal foam bushing 116 does not plastically deform under rotating and operational conditions. In one embodiment, the thickness is based on density of the metal foam bushing, and the metal foam bushing 116 has a relative density of approximately 3% to approximately 50%, or alternatively approximately 10% to approximately 35%, or alternatively approximately 20% to approximately 30%.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A connecting system for connecting a metal component and a ceramic matrix composite component comprising:

a retaining pin;

a metal foam bushing;

a first aperture disposed in the metal component; and a second aperture disposed in the ceramic matrix composite component, wherein the first aperture and the second aperture are configured to form a through-hole when the metal component and the ceramic matrix composite component are engaged, the retaining pin and metal foam bushing being operably arranged within the through-hole to connect the metal component and the ceramic matrix composite component, wherein the metal foam bushing has a coefficient of thermal expansion that is between the coefficient of thermal expansion of the retaining pin and the coefficient of thermal expansion of the ceramic matrix composite component.

2. The connecting system of claim 1, wherein the retaining pin includes material selected from a material having a coefficient of thermal expansion that is greater than the ceramic matrix composite.

3. The connecting system of claim 1, wherein the retaining pin has a coefficient of thermal expansion of approximately equal to or approximately greater than the metal component.

4. The connecting system of claim 1, wherein the ceramic matrix composite includes a reinforcing layer selected from metallic fiber, ceramic fiber, carbon fiber, and combinations thereof.

5. The connecting system of claim 1, wherein the metal foam bushing includes a material selected from titanium, nickel, iron, cobalt, chromium, alloys thereof, and combinations thereof.

6. The connecting system of claim 1, wherein the metal foam bushing has a coefficient of thermal expansion of approximately equal to or approximately less than the retaining pin.

7. The connecting system of claim 1, wherein the ceramic matrix composite includes a matrix material selected from SiC, SiN, and combinations thereof.

8. The connecting system of claim 1, wherein the ceramic matrix composite component is a monolithic airfoil and airfoil segment holder.

9. The connecting system of claim 1, wherein the metal component includes a material selected from titanium, nickel, iron, cobalt, chromium, alloys thereof, and combinations thereof.

10. A turbine blade retaining system of a gas turbine comprising:

a retaining pin;

a metal foam bushing;

a first aperture disposed in a holder segment; and a second aperture disposed in a airfoil segment, wherein the first aperture and the second aperture form a through-hole for receiving the metal foam bushing and the retaining pin when the airfoil segment and holder segment are engaged, the retaining pin and metal foam bushing being operably arranged within the through-hole to connect the airfoil segment and the holder segment to form the turbine blade retaining system, wherein the metal foam bushing has a coefficient of thermal expansion that is between the coefficient of thermal expansion of the retaining pin and the coefficient of thermal expansion of the airfoil segment.

11. The turbine blade retaining system of claim 10, wherein the retaining pin includes material selected from a material having a coefficient of thermal expansion that is greater than the ceramic matrix composite.

12. The turbine blade retaining system of claim 10, wherein the airfoil segment is constructed from a ceramic matrix composite material.

13. The turbine blade retaining system of claim 10, wherein the holder segment includes a material selected from titanium, nickel, iron, cobalt, chromium, alloys thereof, and combinations thereof.

14. The turbine blade retaining system of claim 10, wherein the metal foam bushing includes a material selected from titanium, nickel, iron, cobalt, chromium, alloys thereof, and combinations thereof.

15. The turbine blade retaining system of claim 10, wherein the metal foam bushing has a coefficient of thermal expansion of that approximately equal to or less that of the retaining pin.

16. A rotating component retaining system comprising:

a retaining pin;

a first aperture disposed in a first component, the first component having a first coefficient of thermal expansion; and a second aperture disposed in a second component, the second component having a second coefficient of thermal expansion; and a bushing having a third coefficient of thermal expansion, the third coefficient of thermal expansion being intermediate to the first coefficient of thermal expansion and second coefficient of thermal expansion, wherein the first aperture and the second aperture form a through-hole for receiving the bushing and the retaining pin when the first component and the second component are engaged, the retaining pin and bushing being operably arranged within the through-hole to connect the first component and the second component to form the rotating component retaining system.

17. The rotating component retaining system of claim 16, wherein second coefficient of thermal expansion of the second component is greater than the first coefficient of thermal expansion of the first component.

18. The rotating component retaining system of claim 16, wherein the third coefficient of thermal expansion of the bushing is less than or approximately equal to the second third coefficient of thermal expansion.

19. The rotating component retaining system of claim 16, wherein the bushing includes is an open celled or closed celled metal foam bushing.

* * * * *